US011614790B2

(12) United States Patent
Zhong et al.

(10) Patent No.: US 11,614,790 B2
(45) Date of Patent: Mar. 28, 2023

(54) ELECTRONIC PEN, METHOD AND DEVICE FOR CONTROLLING ELECTRONIC PEN, AND COMPUTER-READABLE STORAGE MEDIUM

(71) Applicant: SHENZHEN QIANFENYI INTELLIGENT TECHNOLOGY CO., LTD, Shenzhen (CN)

(72) Inventors: Hongyao Zhong, Shenzhen (CN); Junjie Lei, Shenzhen (CN); Lin Li, Shenzhen (CN)

(73) Assignee: SHENZHEN QIANFENYI INTELLIGENT TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/585,342

(22) Filed: Jan. 26, 2022

(65) Prior Publication Data
US 2022/0269331 A1      Aug. 25, 2022

(30) Foreign Application Priority Data
Feb. 19, 2021   (CN) .......................... 202110188318.7

(51) Int. Cl.
*G06F 1/3234* (2019.01)
*G06F 3/0354* (2013.01)
*G06F 3/038* (2013.01)
*G06F 3/041* (2006.01)

(52) U.S. Cl.
CPC .......... *G06F 1/3259* (2013.01); *G06F 3/0383* (2013.01); *G06F 3/03545* (2013.01); *G06F 3/041* (2013.01); *G06F 2203/04105* (2013.01)

(58) Field of Classification Search
CPC .. G06F 1/3259; G06F 3/03545; G06F 3/0383; G06F 3/041; G06F 2203/04105
USPC ......................................................... 345/179
See application file for complete search history.

(56) References Cited

U.S. PATENT DOCUMENTS

| 2015/0309599 | A1* | 10/2015 | Michihata ............. G06F 1/3259 345/174 |
| 2017/0060274 | A1 | 3/2017 | Watanabe |
| 2020/0125188 | A1* | 4/2020 | Meng .................. G06F 3/04162 |

FOREIGN PATENT DOCUMENTS

| CN | 109521893 A | 3/2019 |
| CN | 111124158 A | 5/2020 |
| CN | 111124521 A | 5/2020 |
| CN | 111580690 A | 8/2020 |

OTHER PUBLICATIONS

First Office Action issued in counterpart Chinese Patent Application No. 202110188318.7, dated Apr. 8, 2021.
(Continued)

*Primary Examiner* — Amare Mengistu
*Assistant Examiner* — Gloryvid Figueroa-Gibson
(74) *Attorney, Agent, or Firm* — Westbridge IP LLC

(57) ABSTRACT

Disclosed are an electronic pen, a method and a device for controlling an electronic pen, and a computer-readable storage medium. The method includes: obtaining state information of the electronic pen; and determining a time for the electronic pen to send coding signal frequency information according to the state information, and controlling the electronic pen to send the coding signal frequency information when reaching the time, to reduce an energy consumption of the electronic pen.

5 Claims, 6 Drawing Sheets

(56) References Cited

OTHER PUBLICATIONS

Notification to Grant Patent Right for Invention issued in counterpart Chinese Patent Application No. 202110188318.7, dated May 27, 2021.
Second Office Action issued in counterpart Chinese Patent Application No. 202110188318.7, dated Apr. 27, 2021.

* cited by examiner

ELECTRONIC PEN, METHOD AND DEVICE FOR CONTROLLING ELECTRONIC PEN, AND COMPUTER-READABLE STORAGE MEDIUM

CROSS-REFERENCE TO RELATED APPLICATIONS

This application claims priority to Chinese Patent Application No. 202110188318.7, filed on Feb. 19, 2021, the entire disclosure of which is incorporated herein by reference.

TECHNICAL FIELD

The present disclosure relates to the field of display technology, and in particular, to an electronic pen, a method and a device for controlling an electronic pen, and a computer-readable storage medium.

BACKGROUND

With the development of information technology, increasing touch screen devices have entered people's lives, such as touch screen smart TVs, touch screen mobile phones, touch screen pads, or the like. The realization of the touch screen function requires the use of an electronic pen.

The electronic pen realizes synchronous communication with the electronic screen by sending coding signals. If the electronic pen still sends the coding signal when the user does not need to use the electronic pen, it will undoubtedly cause high energy consumption. In order to reduce the energy consumption, Gensor is usually added to the electronic pen to count the time when the electronic pen is not working. When the time reaches the preset value, the electronic pen is in the sleep state. When the pressure sensor detects that the spatial position of the electronic pen has changed, the electronic pen is in the working state. The power consumption is reduced by controlling the changes of the working current and voltage of the electronic pen in different states, but there is still a problem of large power consumption loss in different working states, and the power consumption of the electronic pen cannot be optimally reduced.

SUMMARY

The present disclosure provides an electronic pen, a method and a device for controlling an electronic pen, and a computer-readable storage medium, which aims to solve the problem of large power consumption of the electronic pen.

In order to achieve the above objective, the present disclosure provides a method for controlling an electronic pen, including following operations:

obtaining state information of the electronic pen; and determining a time for the electronic pen to send coding signal frequency information according to the state information, and controlling the electronic pen to send the coding signal frequency information when reaching the time, to reduce an energy consumption of the electronic pen.

In an embodiment, the state information includes a sleep state and a non-sleep state, and the operation of determining a time for the electronic pen to send coding signal frequency information according to the state information includes:

when the electronic pen is in the sleep state, determining a first preset period as a time interval for the electronic pen to send the coding signal frequency information; and when the electronic pen is in the non-sleep state, determining a second preset period as a time interval for the electronic pen to send the coding signal frequency information, and controlling a time threshold for sending the coding signal frequency information by the electronic pen within the second preset period, the first preset period being shorter than the second preset period.

In an embodiment, the non-sleep state includes a working state and a standby state, and the time threshold includes a first time threshold and a second time threshold, and the operation of determining a second preset period as a time interval for the electronic pen to send the coding signal frequency information, and controlling a time threshold for sending the coding signal frequency information by the electronic pen within the second preset period includes:

when the electronic pen is in the standby state, controlling the electronic pen to send the coding signal frequency information within the first time threshold of the second preset period; and when the electronic pen is in the working state, controlling the electronic pen to send the coding signal frequency information within the second time threshold of the second preset period, the second time threshold being greater than or equal to the first time threshold.

In an embodiment, after the operation of controlling the electronic pen to send the coding signal frequency information within the first time threshold of the second preset period, the method further includes:

controlling the electronic pen not to send frequency information within a time range of the second preset period other than the first time threshold.

In an embodiment, after the operation of controlling the electronic pen to send the coding signal frequency information within the second time threshold of the second preset period, the method further includes:

controlling the electronic pen to send pressure frequency information corresponding to a pressure value within a time range of the second preset period other than the second time threshold.

In an embodiment, before the operation of obtaining state information of the electronic pen, the method further includes:

obtaining a pressure value of a pressure sensor of the electronic pen;

when the pressure value is less than a preset pressure threshold value, obtaining a signal value of a dynamic sensor;

after the duration when the signal value is less than the signal threshold is greater than a third time threshold, determining that the electronic pen is in the standby state; and after the duration when the signal value is less than the signal threshold is greater than a fourth time threshold, determining that the electronic pen is in the sleep state, the fourth time threshold being greater than the third time threshold.

In an embodiment, after the operation of obtaining a pressure value of a pressure sensor of the electronic pen, the method further includes:

when the pressure value is greater than the preset pressure threshold, determining that the electronic pen is in the working state.

Besides, in order to achieve the above objective, the present disclosure further provides a device for controlling an electronic pen, including:

an obtaining module for obtaining state information of the electronic pen; and a determination module for determining a time for the electronic pen to send coding signal frequency information according to the state information, and controlling the electronic pen to send the coding signal frequency information when reaching the time, to reduce an energy consumption of the electronic pen.

In order to achieve the above objective, the present disclosure further provides an electronic pen, including a processor, a memory, and a program for controlling an electronic pen stored in the memory and executable on the processor, and when the program is executed by the processor, the operations of the method for controlling the electronic pen as described above are implemented.

In order to achieve the above objective, the present disclosure further provides a computer-readable storage medium, a program for controlling an electronic pen is stored in the computer-readable storage medium, and when the program is executed by the processor, the operations of the method for controlling the electronic pen as described above are implemented.

In this embodiment, first, it is possible to determine the state information of the electronic pen, and then control the time for the electronic pen to send the coding signal frequency information according to the state information of the electronic pen. By controlling the time for the electronic pen to send the coding signal frequency information under different state information, the energy consumption is reduced, and the energy consumption of the electronic pen is further optimized.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only intended to explain the present disclosure, but not to limit the present disclosure.

The main solutions of the present disclosure are: obtaining state information of the electronic pen; and determining a time for the electronic pen to send coding signal frequency information according to the state information, and controlling the electronic pen to send the coding signal frequency information when reaching the time, to reduce an energy consumption of the electronic pen.

Nowadays, when reducing energy consumption, Gensor is usually added to the electronic pen to count the time when the electronic pen is not working. When the time reaches the preset value, the electronic pen is in the sleep state. When the pressure sensor detects that the spatial position of the electronic pen has changed, the electronic pen is in the working state. The power consumption is reduced by controlling the changes of the working current and voltage of the electronic pen in different states, but there is still a problem of large power consumption loss in different working states, and the power consumption of the electronic pen cannot be optimally reduced.

Figure 1:
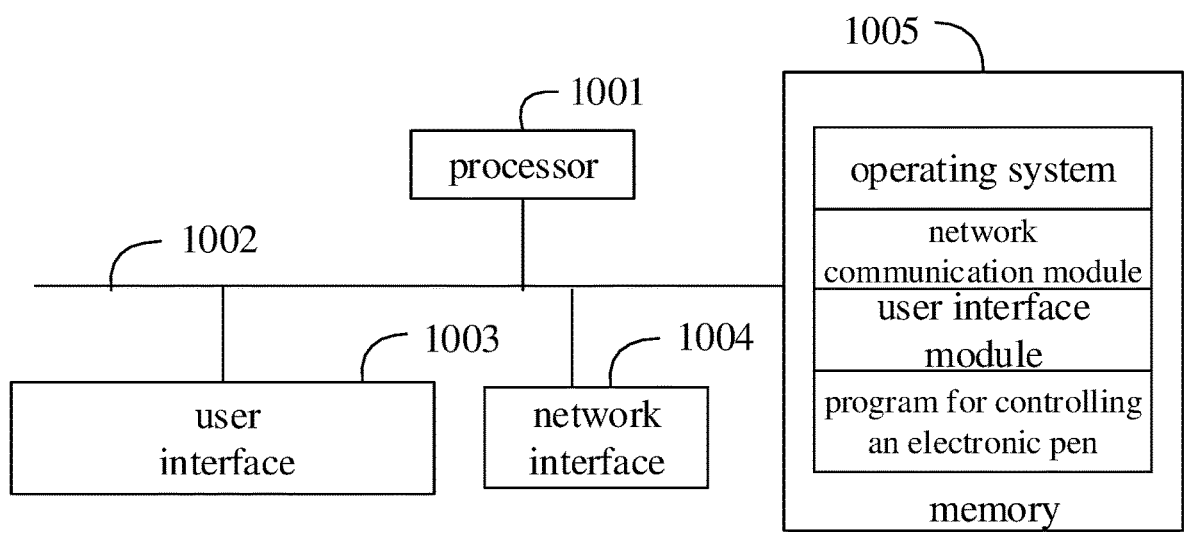
FIG. 1 is a schematic structural diagram of a terminal of a hardware operating environment according to an embodiment of the present disclosure.

As shown in FIG. 1, FIG. 1 is a schematic structural diagram of a terminal of a hardware operating environment according to an embodiment of the present disclosure.

The terminal can include a processor 1001, such as a CPU, a network interface 1004, a user interface 1003, a memory 1005, and a communication bus 1002. The communication bus 1002 is configured to implement communication between the components. The user interface 1003 can include a display, an input unit such as a keyboard. The user interface 1003 can also include a standard wired interface and a wireless interface. The network interface 1004 can further include a standard wired interface and a wireless interface (such as a WI-FI interface). The memory 1005 can be a high-speed random access memory (RAM) or a non-volatile memory, such as a magnetic disk memory. The memory 1005 can also be a storage device independent of the foregoing processor 1001.

Optionally, the terminal can further include a camera, a Radio Frequency (RF) circuit, a sensor, a remote control, an audio circuit, a WiFi module, a detector, and the like. The terminal can also be configured with other sensors such as a gyroscope, a barometer, a hygrometer, and a temperature sensor, which will not be repeated herein.

Those skilled in the art should understand that the terminal structure shown in FIG. 1 does not constitute a limitation on the terminal, and can include more or fewer components, a combination of some components, or differently arranged components than shown in the figure.

As shown in FIG. 1, the memory 1005 as a computer storage medium can include an operating system, a network communication module, a user interface module, and a program for controlling an electronic pen.

In the terminal shown in FIG. 1, the network interface 1004 is mainly configured to connect to a background server and perform data communication with the background server. The user interface 1003 is mainly configured to connect to a client (user) and perform data communication with the client. The processor 1001 can be configured to call the program for controlling the electronic pen stored in the memory 1005, and perform the following operations:

obtaining state information of the electronic pen; and determining a time for the electronic pen to send coding signal frequency information according to the state information, and controlling the electronic pen to send the coding signal frequency information when reaching the time, to reduce an energy consumption of the electronic pen.

Figure 2:
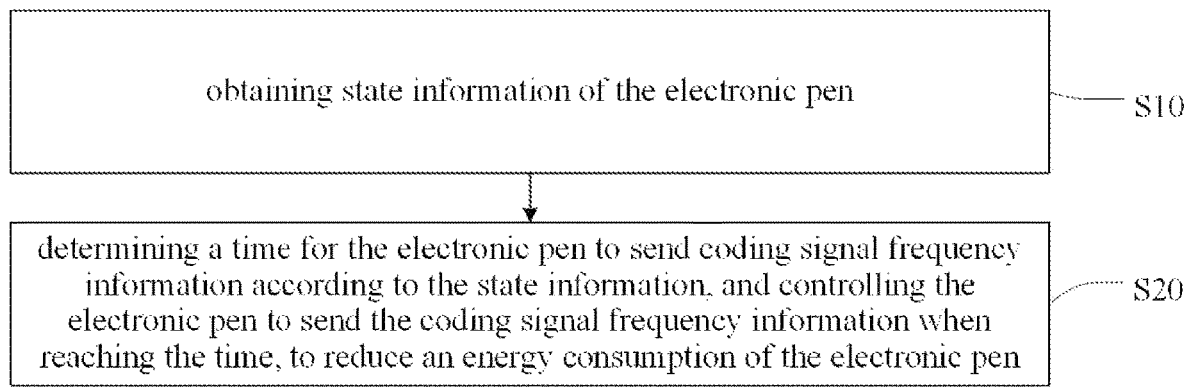
FIG. 2 is a schematic flowchart of a method for controlling an electronic pen according to an embodiment the present disclosure.

As shown in FIG. 2, FIG. 2 is a schematic flowchart of a method for controlling an electronic pen according to an embodiment the present disclosure.

The present disclosure provides a method for controlling an electronic pen. It should be noted that although a logical order is shown in the flowcharts, in some cases, the steps shown or described may be performed in an order different from that herein.

The method for controlling the electronic pen includes the following operations.

Operation S10, obtaining state information of the electronic pen.

The state information includes a working state, a standby state, a sleep state, an initialization state, or the like. The working state is a state in which the electronic pen is used by the user. The sleep state is a state in which the electronic pen turns off each functional module to save power. The standby state is a state in which each functional module is in a standby state to save energy consumption. It can be understood that when the electronic pen is in the working state, the pressure sensor, TX and RX and other modules perform tasks normally, and the energy consumption is the highest. When the electronic pen is in the sleep state, each functional module of the electronic pen stops, and is in the off state, and the energy consumption is the lowest. When the electronic pen is in the standby state, the energy consumption of the electronic pen is between the sleep state and the working state.

Figure 3:
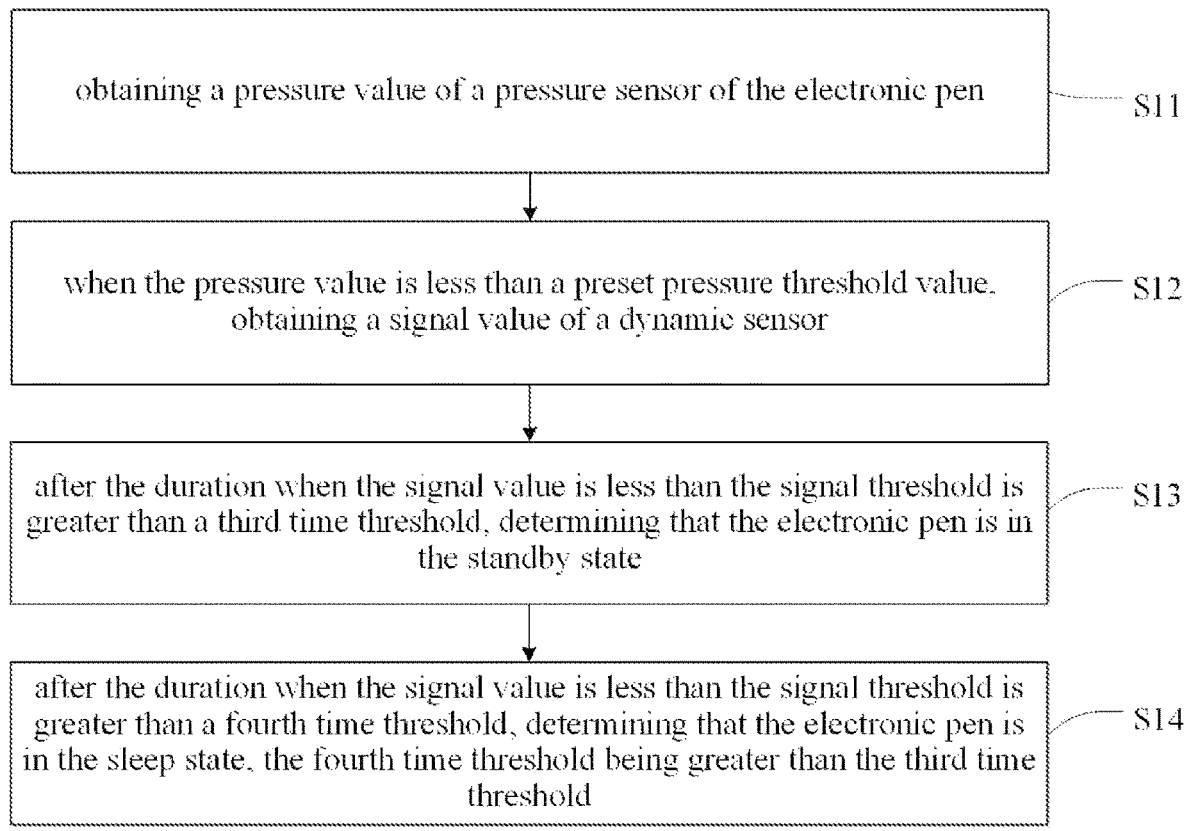
FIG. 3 is a schematic flowchart of the method for controlling the electronic pen according to another embodiment the present disclosure.

As shown in FIG. 3, before the operation of obtaining state information of the electronic pen, the method further includes:

Operation S11, obtaining a pressure value of a pressure sensor of the electronic pen;

Operation S12, when the pressure value is less than a preset pressure threshold value, obtaining a signal value of a dynamic sensor;

Operation S13, after the duration when the signal value is less than the signal threshold is greater than a third time threshold, determining that the electronic pen is in the standby state; and Operation S14, after the duration when the signal value is less than the signal threshold is greater than a fourth time threshold, determining that the electronic pen is in the sleep state, the fourth time threshold being greater than the third time threshold.

In the present disclosure, the electronic pen is provided with a pressure sensor, a dynamic sensor, and a switch button. The processor in the electronic pen determines the state information of the electronic pen according to the pressure sensor, the switch button and the dynamic sensor.

After the operation of obtaining a pressure value of a pressure sensor of the electronic pen, the method further includes:

when the pressure value is greater than the preset pressure threshold, determining that the electronic pen is in the working state.

When the electronic pen is in the working state, since the user holds the electronic pen to write, the pressure value of the pressure sensor tends to change, so the state information of the electronic pen can be determined by collecting the pressure value of the pressure sensor.

The dynamic sensor is an acceleration sensor, a gyroscope or a gravity sensor.

The preset pressure threshold is the magnitude of the pressure value detected by the pressure sensor when the user writes with the electronic pen. In the present disclosure, in order to control the state information output by the electronic pen more accurately, in this embodiment, state information can also be distinguished according to the writing habits of different users. For example, through long-term data collection, the pressure value of the pressure sensor when the user is writing can be obtained and analyzed to accurately control the state information of the electronic pen, thereby avoiding misjudgment of the state information and avoiding the problem of mistakenly starting to enter the working state when the user is not using the electronic pen, resulting in waste of power consumption, or the problem of not being able to enter the working state in time when the user needs to use the electronic pen. The specific distinguishing method can be, in the initial use, the user's preset pressure threshold is set as the standard value. The standard value is a factory-set value, and the preset pressure threshold is modified by detecting the user's usage habits within 30 days, so that the electronic pen can be more accurately controlled to enter different state information.

Specifically, for example, the preset pressure threshold of the electronic pen set in the factory is 0.5N (that is, it is the critical value, when there is a force of 0.5N, the electronic pen is determined to be in a working state). Through data collection within 30 days, it is determined that the user holds the electronic pen even when not writing. However, the pressure value when the user is writing will be relatively large. In order to prevent the preset pressure threshold of 0.5N from triggering the electronic pen by mistake, resulting in wasting energy consumption, the preset pressure value is increased to 0.7N. When the pressure sensor of the electronic pen detects a pressure value greater than 0.7N, the electronic pen is controlled to enter the working state.

According to the received pressure value of the pressure sensor, the XYZ value of the acceleration sensor, and the change of the switch button, the processor makes the electronic pen in different states such as sleep state, standby state, and working state. When the XYZ value of the accelerometer changes (the signal value of the acceleration sensor is greater than the signal threshold), or the switch button interrupt signal is sent to the processor through the communication interface, the processor will make the TX boost circuit output the coding signal to the pen circuit and transmit the coding signal to the touch screen TP.

When the obtained pressure value of the pressure sensor is less than 0.7N, and the acceleration sensor does not move continuously for 1 minute, that is, the duration when the signal value of the dynamic sensor is less than the signal threshold reaches the third time threshold (one minute), the electronic pen is controlled to enter the standby state. When the obtained pressure value of the pressure sensor is less than 0.7N, and the acceleration sensor does not move continuously for 2 minutes, that is, the duration when the signal value of the dynamic sensor is less than the signal threshold reaches the third time threshold (2 minutes), the electronic pen is controlled to enter the sleep state.

Operation S20, determining a time for the electronic pen to send coding signal frequency information according to the state information, and controlling the electronic pen to send the coding signal frequency information when reaching the time, to reduce an energy consumption of the electronic pen.

The coding signal frequency information is the frequency information sent by the electronic pen to the display device, and the frequency is usually controlled at 15 kHZ. In the present disclosure, when it is determined that the electronic pen is in different state information, the time for the electronic pen to send the coding signal frequency information can be determined according to the state information of the electronic pen, so as to reduce the energy consumption of the electronic pen.

For example, in this embodiment, when the electronic pen is in a sleep state, it is determined that the time for the electronic pen to send the coding signal frequency information at the 60 ms, 120 ms, 180 ms, and so on. When the electronic pen is in the working state and the standby state, it is determined that the time for the electronic pen to send the coding signal frequency information to the display terminal is from the 1st ms to the 8th ms, and from the 17th to the 25th ms.

In this embodiment, first, it is possible to determine the state information of the electronic pen, and then control the time for the electronic pen to send the coding signal frequency information according to the state information of the electronic pen. By controlling the time for the electronic pen to send the coding signal frequency information under different state information, the energy consumption is reduced, and the energy consumption of the electronic pen is further optimized.

Figure 4:
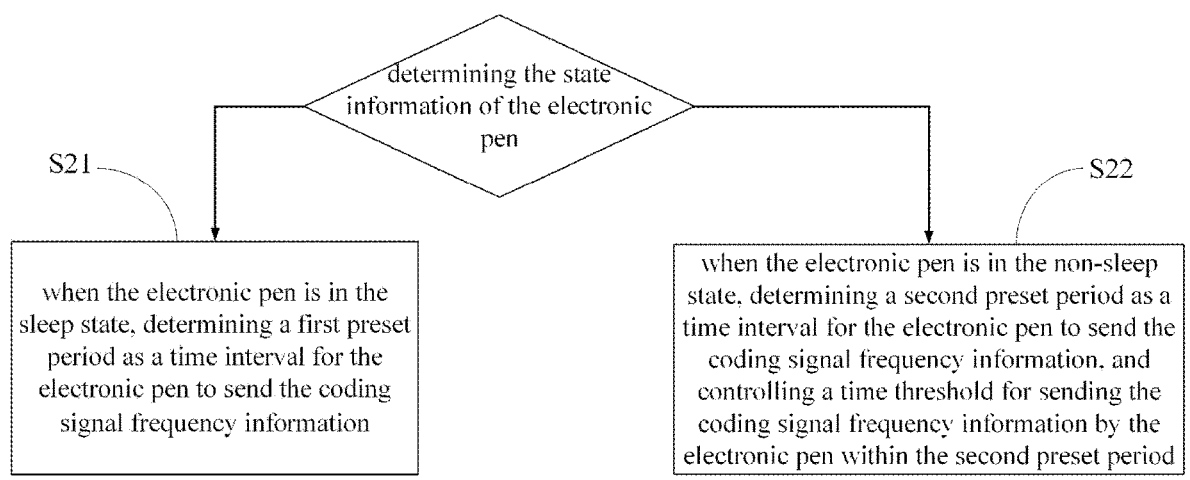
FIG. 4 is a schematic flowchart of the method for controlling the electronic pen according to another embodiment the present disclosure.

Further, as shown in FIG. 4, another embodiment of the method for controlling the electronic pen control of the present disclosure is proposed.

The state information includes a sleep state and a non-sleep state, and the operation of determining a time for the electronic pen to send coding signal frequency information according to the state information includes:

Operation S21, when the electronic pen is in the sleep state, determining a first preset period as a time interval for the electronic pen to send the coding signal frequency information; and Operation S22, when the electronic pen is in the non-sleep state, determining a second preset period as a time interval for the electronic pen to send the coding signal frequency information, and controlling a time threshold for sending the coding signal frequency information by the electronic pen within the second preset period, the first preset period being shorter than the second preset period.

The first preset period is the period of the coding signal frequency information that needs to be sent to the display device when the electronic pen is in the sleep state, and the duration of the period can be set by the user. Further, in the present disclosure, the period of sending the coding signal frequency information when the electronic pen is in the sleep state can also be determined through data analysis based on the user's usage habits. For example, the user learns by using an iPad and the electronic pen. During the day, the user needs to go to work, usually study at night. Then it is possible to set the first preset period when the electronic pen is in the sleep state to be 120 ms during the day, and control the electronic pen to send the coding signal frequency information only once within two minutes. When it is obtained that the system time is night, the period of controlling the electronic pen to send the coding signal frequency information in the sleep state is 60 ms, then, the electronic pen is controlled to send a coding signal once within 60 ms, which realizes the optimization of the power consumption of the electronic device in the sleep state.

The second period is the period of the coding signal frequency information that needs to be sent to the display device when the electronic pen is in a non-sleep state, and the duration of the period can be set by the user. The non-sleep state includes a working state and a standby state. In this embodiment, when it is determined that the electronic pen is in a non-sleep state, the time for the electronic pen to send the coding signal frequency information in the second preset period is controlled.

In the second preset period, the time for sending the coding signal frequency information can be the first 5 s or the first 8 s of the second cycle, which can be specifically set by the user.

In this embodiment, for the electronic pen in different states, the time for sending the coding signal frequency information is different, and the electronic pen is controlled not to send the task frequency information when it is in the sleep state, thereby saving the energy consumed by sending the coding signal frequency information for a long time when the electronic pen is in the sleep state, and reducing the power consumption of the electronic pen.

Figure 5:
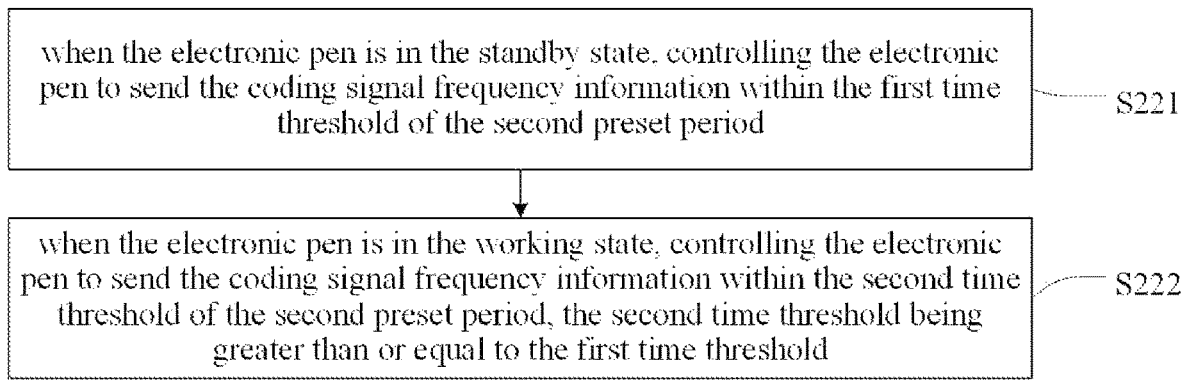
FIG. 5 is a schematic flowchart of the method for controlling the electronic pen according to another embodiment the present disclosure.

As shown in FIG. 5, the operation of determining a second preset period as a time interval for the electronic pen to send the coding signal frequency information, and controlling a time threshold for sending the coding signal frequency information by the electronic pen within the second preset period includes:

Operation 5221, when the electronic pen is in the standby state, controlling the electronic pen to send the coding signal frequency information within the first time threshold of the second preset period; and Operation 5222, when the electronic pen is in the working state, controlling the electronic pen to send the coding signal frequency information within the second time threshold of the second preset period, the second time threshold being greater than or equal to the first time threshold.

In this embodiment, when the electronic pen is in a non-sleep state, the time for the electronic pen to send the coding signal frequency within the preset time of the second preset period is controlled.

After the operation of controlling the electronic pen to send the coding signal frequency information within the first time threshold of the second preset period, the method further includes:

controlling the electronic pen not to send frequency information within a time range of the second preset period other than the first time threshold.

After the operation of controlling the electronic pen to send the coding signal frequency information within the second time threshold of the second preset period, the method further includes:

controlling the electronic pen to send pressure frequency information corresponding to a pressure value within a time range of the second preset period other than the second time threshold.

It can be understood that the electronic pen sends the pressure value detected by the pressure sensor when the user is writing to the display device that has established a connection relationship, so that when the display device receives the pressure value, the writing handwriting of the corresponding thickness is displayed on the screen according to the pressure value. In the related art, there are two methods for the electronic pen to send the pressure value to the display device. One is to encode the obtained pressure value to form an encoded signal and send the encoded signal to the display device, after receiving the encoded signal, the display device decodes the signal to obtain the pressure value. The second is to further determine the pressure frequency information corresponding to the pressure value after obtaining the pressure value, and then send the pressure frequency information to the display device, after the display device receives the pressure frequency information, the pressure value can be obtained according to the established agreement with the electronic pen.

In the present disclosure, the pressure value transmitted by the electronic pen to the display device is determined by sending frequency information. Therefore, when it is detected that the electronic pen is in the working state, the pressure value of the user writing with the electronic pen needs to be sent to the display device to form the corresponding pressure frequency information.

In this embodiment, the second preset period is 16 ms. When the electronic pen is in the standby state, it does not need to send any pressure frequency information to the display device, but only needs to send the coding signal frequency information. In one period (16 ms), the first time threshold can be set to 8 ms. In the first time threshold of the second preset period, the electronic pen continuously sends the coding signal frequency information to the display device. In the last 8 ms of the second preset period, the electronic pen does not send any frequency information, and when the next second preset period starts, the above steps are repeated.

When the electronic pen is in the working state, the electronic pen is controlled to continuously send the coding signal frequency information to the display device within the second time threshold of the second preset period (the first 8 ms). In the last 8 ms of the second preset period, the electronic pen sends the pressure frequency information corresponding to the pressure value to the display device, so that the display device can obtain the pressure value when the user writes according to the pressure frequency information after receiving the pressure frequency information.

The purpose of saving energy consumption is achieved by controlling the electronic pen in the standby state not to send any frequency information in the last 8 ms of the second preset period.

Figure 6:
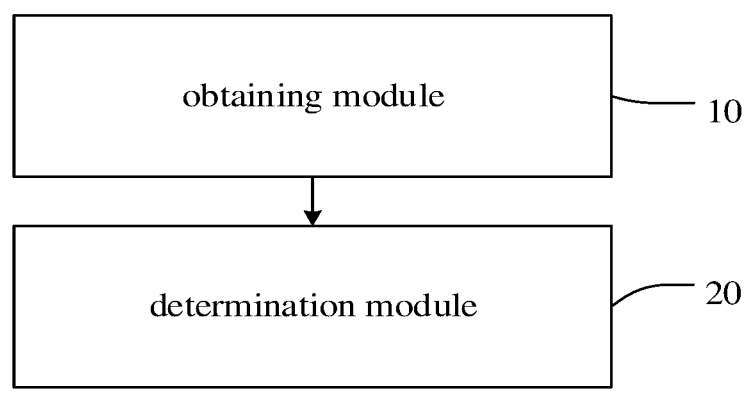
FIG. 6 is a schematic diagram of functional modules of the method for controlling the electronic pen according to another embodiment the present disclosure.

As shown in FIG. 6, FIG. 6 is a schematic flowchart of functional modules of the present disclosure. In order to realize the above-mentioned embodiments, the present disclosure also provides a device for controlling an electronic pen, including:

an obtaining module 10 for obtaining state information of the electronic pen; and a determination module 20 for determining a time for the electronic pen to send coding signal frequency information according to the state information, and controlling the electronic pen to send the coding signal frequency information when reaching the time, to reduce an energy consumption of the electronic pen.

In order to achieve the above objective, the present disclosure further provides an electronic pen, including a processor, a memory, and a program for controlling an electronic pen stored in the memory and executable on the processor, and when the program is executed by the processor, the operations of the method for controlling the electronic pen are implemented.

In order to achieve the above objective, the present disclosure further provides a computer-readable storage medium, a program for controlling an electronic pen is stored in the computer-readable storage medium, and when the program is executed by the processor, the operations of the method for controlling the electronic pen are implemented.

As will be appreciated by one skilled in the art, the embodiments of the present disclosure may be provided as a method, a system, or a computer program product. Accordingly, the present disclosure can take the form of embodiment having only hardware, having only software, or combining software and hardware. Furthermore, the present disclosure can take the form of a computer program product embodied on one or more computer-usable storage media (including, but not limited to, disk storage, CD-ROM, optical storage, etc.) having computer-usable program code embodied therein.

The present disclosure is described with reference to flowchart illustrations and/or block diagrams of methods, apparatus (systems), and computer program products according to embodiments of the present disclosure. It will be understood that each flow and/or block in the flowcharts and/or block diagrams, and combinations of flows and/or blocks in the flowcharts and/or block diagrams, can be implemented by computer program instructions. These computer program instructions can be provided to the processor of a general purpose computer, special purpose computer, embedded processor or other programmable data processing device to produce a machine, such that the instructions executed by a processor of a computer or other programmable data processing device produce means for implementing the functions specified in a flow or flows of the flowcharts and/or a block or blocks of the block diagrams.

These computer program instructions can also be stored in computer-readable memory capable of directing a computer or other programmable data processing device to operate in a particular manner, such that the instructions stored in the computer readable memory result in an article of manufacture comprising instruction means implementing the functions specified in the flow or flows of the flowcharts and/or the block or blocks of the block diagrams.

These computer program instructions can also be loaded on a computer or other programmable data processing device to cause a series of operational steps to be performed on the computer or other programmable device to produce a computer-implemented process, such that the instructions executing on a computer or other programmable device thus provide steps for implementing the functions specified in one or more of the flowcharts and/or one or more blocks of the block diagrams.

It should be noted that, in the claims, any reference signs placed between parentheses shall not be construed as limiting the claim. The word "comprising" does not exclude the presence of elements or steps not listed in a claim. The word "a" or "an" preceding an element does not preclude the presence of a plurality of such elements. The present disclosure may be implemented by means of hardware comprising several different components and by means of a suitably programmed computer. In a unit claim enumerating several means, several of these means may be embodied by one and the same item of hardware. The use of the words first, second, and third, etc. do not denote any order. These words can be interpreted as names.

While alternative embodiments of the present disclosure have been described, additional changes and modifications to these embodiments may occur to those skilled in the art once the basic inventive concepts are known. Therefore, the appended claims are intended to be construed to include alternative embodiments and all changes and modifications that fall within the scope of the present disclosure.

Obviously, those skilled in the art can make various changes and modifications to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A method for controlling an electronic pen, comprising following operations:

obtaining state information of the electronic pen; and determining a time for the electronic pen to send coding signal frequency information according to the state information, and controlling the electronic pen to send the coding signal frequency information when reaching the time, to reduce an energy consumption of the electronic pen;

wherein before the operation of obtaining the state information of the electronic pen, the method further comprises:

obtaining a pressure value of a pressure sensor of the electronic pen;

when the pressure value is less than a preset pressure threshold value, obtaining a signal value of a dynamic sensor;

after a duration when the signal value is less than a signal threshold is greater than a third time threshold, determining that the electronic pen is in a standby state;

after the duration when the signal value is less than the signal threshold is greater than a fourth time threshold, determining that the electronic pen is in a sleep state, the fourth time threshold being greater than the third time threshold; and when the pressure value is greater than the preset pressure threshold, determining that the electronic pen is in a working state;

wherein the operation of determining a time for the electronic pen to send coding signal frequency information according to the state information comprises:

when the electronic pen is in the sleep state, determining a first preset period as a time interval for the electronic pen to send the coding signal frequency information; and when the electronic pen is in the working state and the standby state, determining a second preset period as a time interval for the electronic pen to send the coding signal frequency information, and controlling a time threshold for sending the coding signal frequency information by the electronic pen within the second preset period, the first preset period being shorter than the second preset period;

wherein the time threshold comprises a first time threshold and a second time threshold, and the operation of determining a second preset period as a time interval for the electronic pen to send the coding signal frequency information, and controlling a time threshold for sending the coding signal frequency information by the electronic pen within the second preset period comprises:

when the electronic pen is in the standby state, controlling the electronic pen to send the coding signal frequency information within the first time threshold of the second preset period; and when the electronic pen is in the working state, controlling the electronic pen to send the coding signal frequency information within the second time threshold of the second preset period, the second time threshold being greater than or equal to the first time threshold.

2. The method of claim 1, wherein after the operation of controlling the electronic pen to send the coding signal frequency information within the first time threshold of the second preset period, the method further comprises:

controlling the electronic pen not to send frequency information within a time range of the second preset period other than the first time threshold.

3. The method of claim 1, wherein after the operation of controlling the electronic pen to send the coding signal frequency information within the second time threshold of the second preset period, the method further comprises:

controlling the electronic pen to send pressure frequency information corresponding to the pressure value within a time range of the second preset period other than the second time threshold.

4. The electronic pen, comprising a processor, a memory, and a program for controlling the electronic pen stored in the memory and executable on the processor, wherein when the program is executed by the processor, the operations of the method for controlling the electronic pen according to claim 1 are implemented.

5. A non-transitory computer-readable storage medium, wherein a program for controlling the electronic pen is stored in the non-transitory computer-readable storage medium, and when the program is executed by a processor, the operations of the method for controlling the electronic pen according to claim 1 are implemented.

* * * * *